US006964130B1

(12) United States Patent
Hartelius

(10) Patent No.: US 6,964,130 B1
(45) Date of Patent: Nov. 15, 2005

(54) COMBINATION PLANTER AND STEP-LIGHT

(76) Inventor: Mark E. Hartelius, 8112 Komensky, Chicago, IL (US) 60652

( * ) Notice: Subject to any disclaimer, the term of this patent is extended or adjusted under 35 U.S.C. 154(b) by 34 days.

(21) Appl. No.: 10/785,926

(22) Filed: Feb. 23, 2004

Related U.S. Application Data

(60) Provisional application No. 60/449,038, filed on Feb. 21, 2003.

(51) Int. Cl.$^7$ .............................. A01G 9/02; F21V 7/04
(52) U.S. Cl. ........................................ 47/66.6; 362/154
(58) Field of Search ........................ 47/65.7; 362/122, 362/154

(56) References Cited

U.S. PATENT DOCUMENTS

| | | | | |
|---|---|---|---|---|
| 934,122 A | * | 9/1909 | Woodman | 472/51 |
| 3,030,735 A | * | 4/1962 | Bodkins | 47/39 |
| 3,735,113 A | * | 5/1973 | Stott | 362/565 |
| 4,120,025 A | * | 10/1978 | Deaven | 362/153 |
| 4,394,714 A | * | 7/1983 | Rote | 362/576 |
| 4,612,606 A | * | 9/1986 | Roberts | 362/146 |
| 4,646,209 A | * | 2/1987 | Jansen | 362/122 |
| 4,758,934 A | | 7/1988 | Kohorn | 362/145 |
| 4,886,183 A | * | 12/1989 | Fleming | 220/739 |
| 4,886,961 A | | 12/1989 | Kimura et al. | 250/205 |
| 4,980,807 A | | 12/1990 | Von Kohorn | 362/122 |
| 5,119,279 A | * | 6/1992 | Makowsky | 362/101 |
| D374,843 S | | 10/1996 | Attanasio | D11/144 |
| 5,741,061 A | * | 4/1998 | Lehmann et al. | 362/154 |
| 5,879,071 A | * | 3/1999 | Sanford, Jr. | 362/154 |
| 6,098,338 A | | 8/2000 | Tilton | 47/66.6 |
| 6,217,198 B1 | | 4/2001 | Midiri | 362/413 |
| 6,230,437 B1 | | 5/2001 | Wolverton et al. | 47/39 |
| 6,233,871 B1 | | 5/2001 | Ho | 47/79 |
| 6,253,489 B1 | * | 7/2001 | Sung et al. | 47/65.7 |
| D481,971 S | | 11/2003 | Hartelius et al. | D11/143 |
| 2004/0017683 A1 | * | 1/2004 | James | 362/154 |

* cited by examiner

Primary Examiner—Francis T. Palo
(74) Attorney, Agent, or Firm—Robert W. J. Usher

(57) ABSTRACT

A combination planter and step-light has a portable, open topped receptacle having a base and a plurality of sidewalls upstanding therefrom. The sidewalls are a minor rear end wall and major outer wall forming a corner seating adjacent a corner of a step and an outer end of the step, and joined at free ends by an inner facing wall which converges toward the major end wall as it extends outward and forwards toward a front of the step. A compartment in the receptacle receives a light detecting and illuminating module inserted into the compartment from below, is molded in the receptacle aligned with an aperture in the inner wall. The module has a lamp, a control circuit and a photosensitive device for detecting the ambient light level to switch the lamp on and off at dusk and dawn.

6 Claims, 3 Drawing Sheets

COMBINATION PLANTER AND STEP-LIGHT

RELATED APPLICATION

This application claims priority from provisional application 60/449,038, filed Feb. 21, 2003.

CROSS-REFERENCE TO RELATED APPLICATIONS

This application relies on and claims the benefit of the filing date of U.S. Provisional Patent Application No. 60/449,038, filed 21 Feb. 2003, the entire disclosure of which is incorporated herein by reference.

FIELD OF THE INVENTION

The present invention relates to planters which provide illumination and in particular to a combination planter and step-light which mounts a lamp so that the beam thereof will illuminate a step on which the planter stands.

BACKGROUND OF THE INVENTION

It known to provide planters with lamps to illuminate plants and some planters also provide some illumination for the surrounding area.

However, none of the prior planters mount a lamp adjacent a corner formed by the junction of the horizontal surface or tread of a step on which the planter stands and the vertical riser of the next step so that the light beam preferentially illuminates that corner.

SUMMARY OF THE INVENTION

It is an object of the invention to provide a portable planter which incorporates a lamp mounted adjacent the tread of a step on which the planter stands, and preferably adjacent a vertical front face or riser of the next step up, so that the light beam preferentially illuminates the corner or junction formed thereby.

This provides both an aesthetically pleasing effect and additional safety for a person negotiating the steps in the dark.

It is another object of the invention to provide a portable planter in which the lamp electrical circuitry is protected from the environment particularly, ingress of rain and moisture.

It is a further object of the invention to provide a combination planter and lamp which incorporates a photosensitve device which detects the ambient light level and which is connected to a lamp control circuit to switch the lamp on and off when the ambient light level falls below and increases above a predetermined threshold, usually at dusk and dawn.

According to the invention, a combination planter and step-light comprises a portable, elongate, tapering receptacle for containing plants and potting and having a base and a plurality of sidewalls upstanding therefrom to form an open plant receiving top, the sidewalls comprising a minor rear end wall and a major outer wall joined at right angles to form a corner for seating adjacent a corner of a step and an outer end of the step, and joined at free ends by an inner facing wall which converges toward the major end wall as it extends outward and forwards toward a front of the step, an aperture being formed in a portion of the inner wall, and means for producing light located in the receptacle in alignment with the aperture so that the light is emitted from the wall as an inwardly directed beam.

The outward, preferable curving, taper of the inner wall or face of the planter both provides an aesthetically pleasing appearance and avoids provision of a possibly light blocking, inner front corner of the receptacle providing maximum exposure of the light to a person who needs to ascend or descend the steps adjacent their outer ends, for example, while using a bannister or rail.

The lamp, light sensor and associated control circuitry and power supply/battery may be contained in a moisture proof housing module and the receptacle may be molded or otherwise provided with a module receiving compartment communicating with the aperture and which isolates the module from a plant receiving interior of the receptacle.

Preferably, the compartment is integrally formed by the receptacle molding step as an open bottomed cavity adjacent the rear wall, opening through the base and at the aperture through the face wall and sealed from the plant receiving interior of the receptacle by an upstanding, half-height inner wall portion which bridges the outer and face walls, spaced apart from the rear wall and is closed at a top by a horizontal wall portion bridging the inner wall portion, rear, face and outer walls. The aperture is preferably a vertical slot communicating through the base with the open bottom of the cavity and of a less height than the compartment.

The lighting module has a rectanguloid rigid plastic housing body wider than a width of the aperture slot and a lamp receiving portion of less width than the width of the slot extending form a front end face on a free end of which is a mounting flange of greater width than the slot so that the portion defines a neck so that the module can be inserted upwards through the bottom opening into the cavity with the neck slid up the slot and edge portions of the mounting flange engaging the face wall in module mounting engagement mounting with the face wall adjacent the slot.

BRIEF DESCRIPTION OF THE DRAWINGS

In order that the invention may be readily understood, a specific embodiment thereof will now be described by way of example only and with reference to the accompanying drawings in which.

PARTICULAR DESCRIPTION

Figure 1:
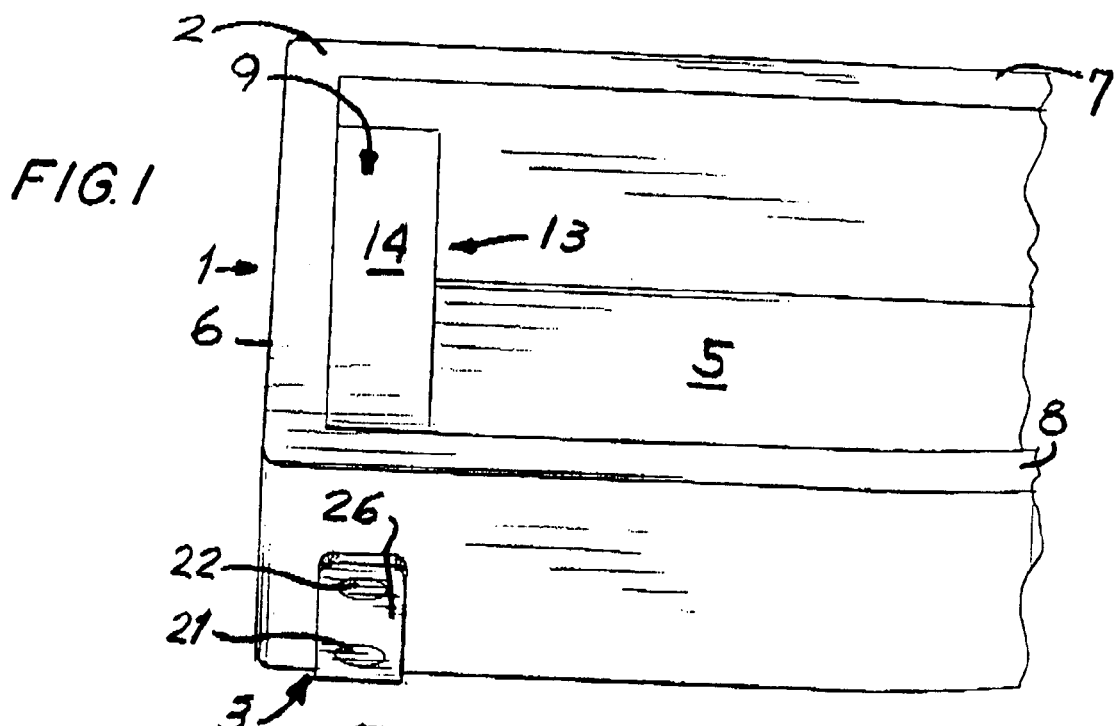
FIG. 1 is a photograph of a rear end portion of a model of an assembled combination planter and step-light module taken from above.
Figure 2:
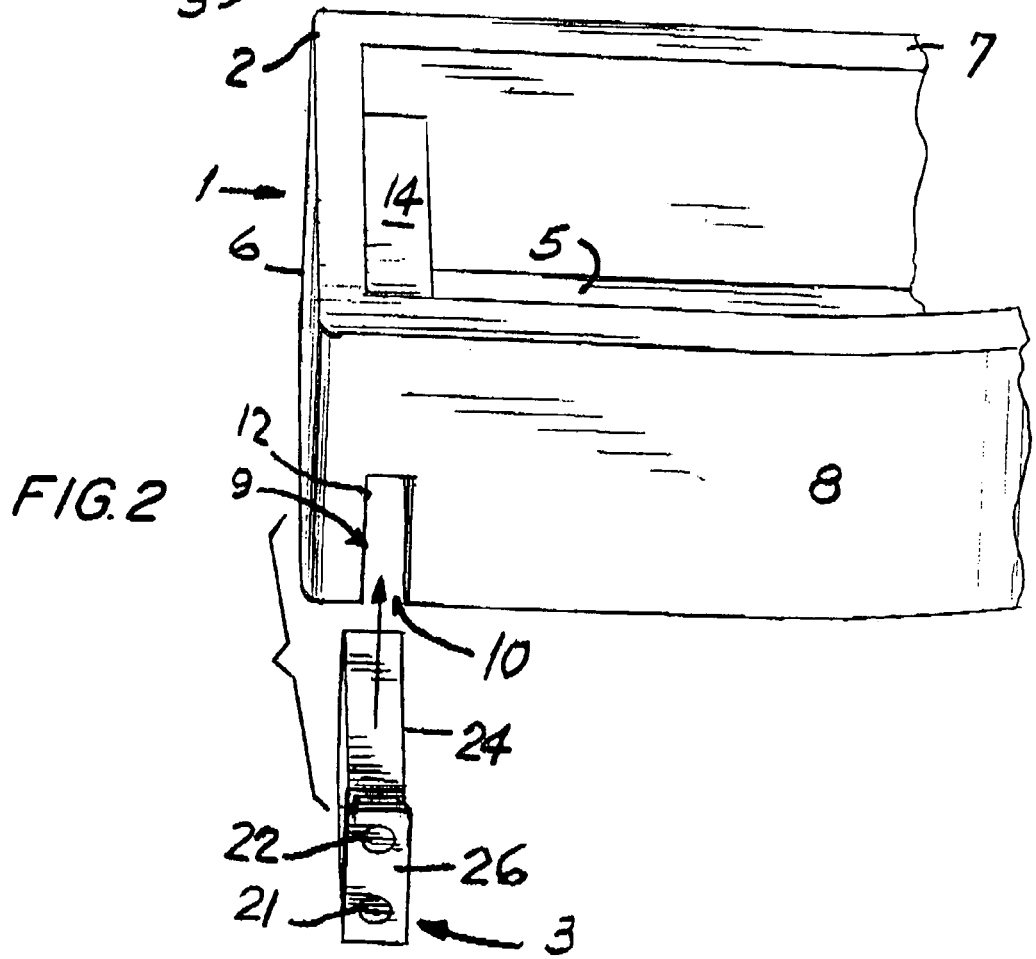
FIG. 2 is similar view to FIG. 1 with the light module disassembled.
Figure 3:
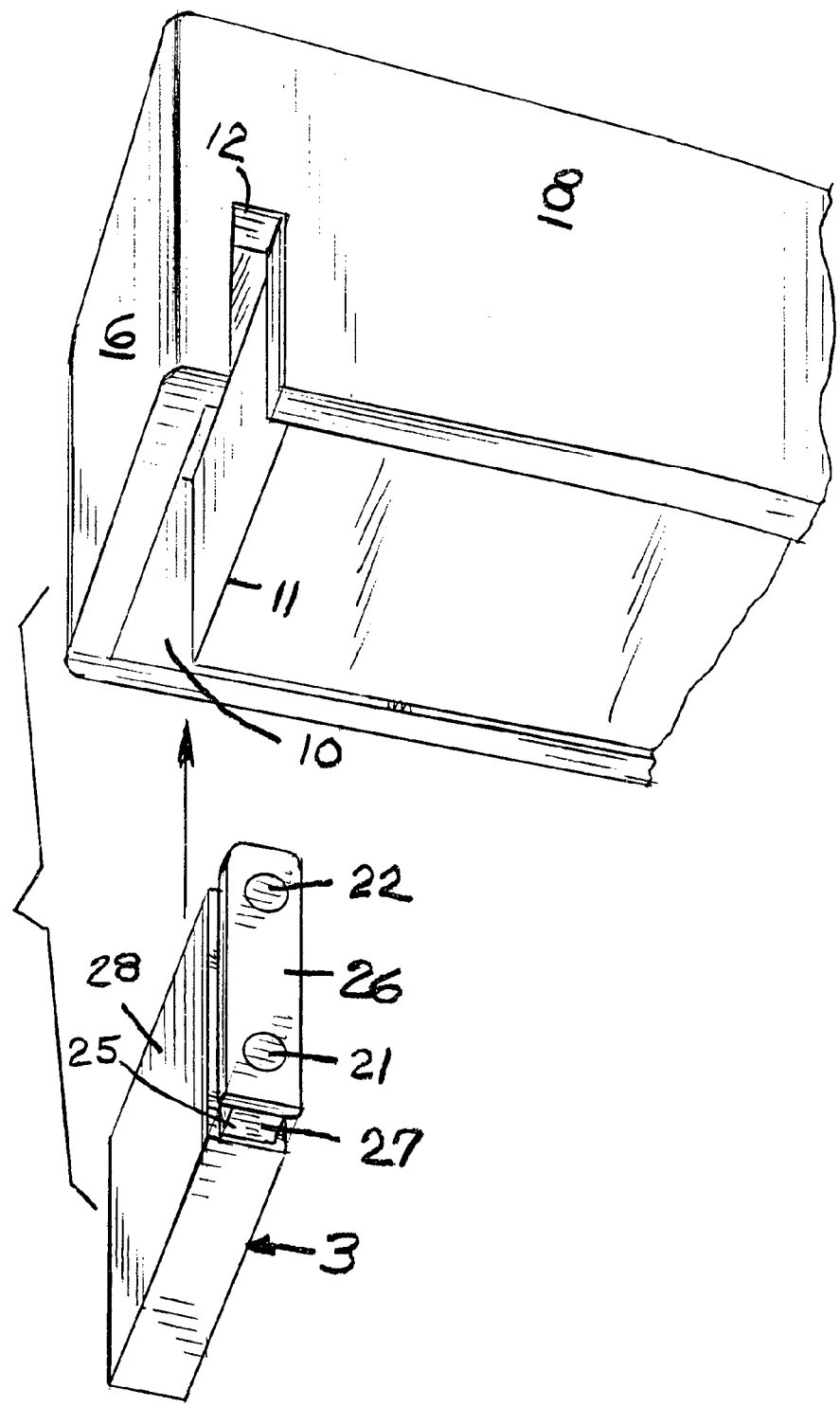
FIG. 3 is a photograph of a rear of the model of the combination planter and step-light with the light module disassembled.
Figure 4:
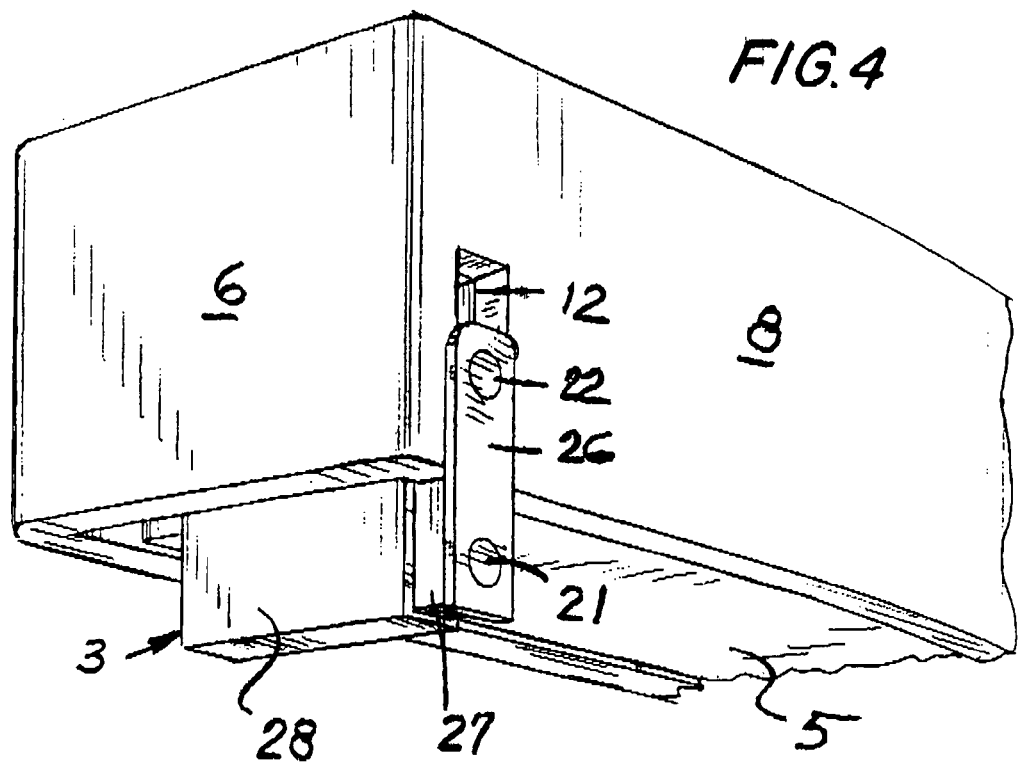
FIG. 4 is a photograph of a rear of the model of the combination planter and step-light with the light module partly inserted therein; and, FIG. 5 is a photograph of a model of an assembled combination planter and step-light positioned on a step.
Figure 5:
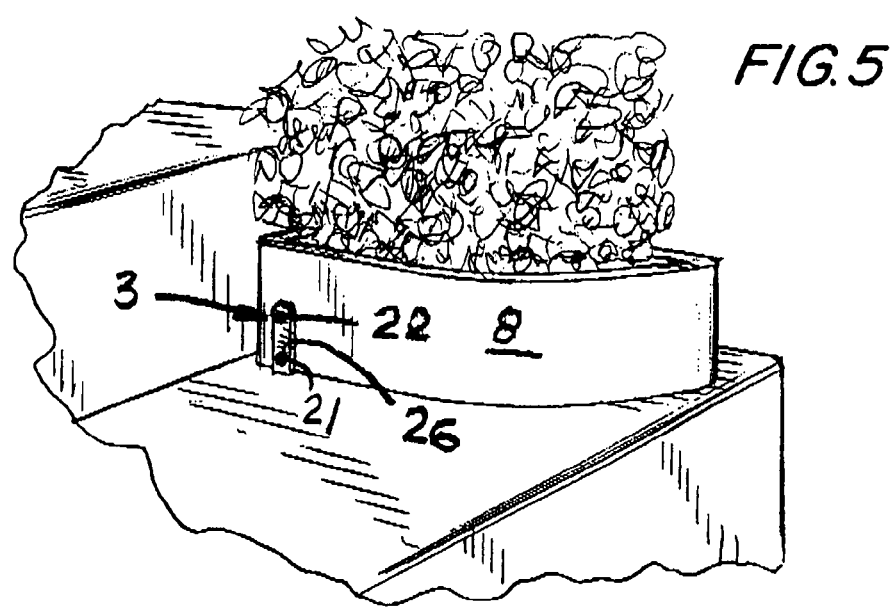

The combination planter and step-light 1 comprises a receptacle 2 for soil and plants housing a light module 3.

The receptacle is molded in one piece from polyurethane foam as an elongate, tapering plant and potting (e.g. soil) soil container having a base 5 and three sidewalls upstanding therefrom to form an open top, the sidewalls comprising a minor rear end wall 6 and a major (longer) outer wall 7 joined at a right angled corner for seating adjacent the step corner and an outer end of the step, and joined at free ends by an inner or face wall 8 which extends, forward from the rear wall, initially substantially parallel to the outer wall until midway along the length of the receptacle, and then curves toward the major outer wall as it extends forwards toward a front of the step.

The receptacle is integrally molded with a light module receiving compartment 9 which isolates sealingly the module from a plant receiving interior of the receptacle. The compartment comprises a cavity 10 formed adjacent the rear wall 6, having an bottom opening 11 extending through the base and a light admitting vertical aperture slot 12 which communicates with the bottom opening and extends up the inner face wall by a distance less than the height of the cavity. The cavity is sealed from the plant receiving interior of the receptacle by an upstanding, half-height, internal wall portion 13 which bridges the outer and face walls, adjacent and spaced apart from the rear wall and is closed at a top by a horizontal wall portion 14 bridging the internal wall portion, rear, face and outer walls.

The lighting module comprises a lamp (LED) 21, a light sensor 22 and control circuitry connected to supply power from a battery to the lamp when the level of illumination falls below a predetermined threshold (at dusk) and to cut off the supply when the level of illumination rises above the threshold (at dawn). Such devices have been well known for may years and may, for example, be similar to that described in U.S. Pat. No. 4,886,961 issued to Kimura in 1989, the disclosure of which is incorporated herein by reference.

The lighting module has a rectanguloid rigid plastic housing body 24 wider than a width of the aperture slot 12 and a lamp and light sensor receiving portion 25 of less width than the width of the slot extending form a front end face, on a free end of which is a mounting flange 26 of greater width than the slot 12 so that the portion defines a neck 27 so that the module can be inserted upwards through the bottom opening 11 into the cavity with the neck 27 sliding up the slot 12 and edge portions of the mounting flange engaging the face wall in module mounting engagement. The flange also resists entry of moisture into the compartment. A battery access cover 28 is fastened to one major face of the housing by screws and provided with a peripheral moisture sealing gasket.

Thus, when the combination planters and step-lights are mounted at both outer ends of the step, it will be very well and attractively lit. The curvatures of face walls of respective receptacles for opposite ends of the step are in opposite directions from each other, the combination planters and step-lights normally being supplied in sets of two.

What is claimed is:

1. A combination planter and step-light comprising a portable, receptacle for plants and potting and having a base and a plurality of sidewalls upstanding therefrom to form an open plant receiving top, an open ended slot being formed in one sidewall, and a moisture proof housing module comprising a rigid plastic housing body wider than a width of the slot and a lamp receiving portion of less width than the width of the slot extending from a front end face on a free end of which is a mounting flange of greater width than the slot so that the lamp receiving portion defines a neck permitting the module to be inserted into the receptacle by the neck sliding along the slot and edge portions of the mounting flange engaging an outer face of the one side wall in module mounting engagement so that a lamp received in the lamp receiving portion emits a beam of light from the wall.

2. A combination planter and step-light according to claim 1 wherein the receptacle has a compartment communicating with the slot and which receives and isolates the housing module from any plants and potting contained in the receptacle.

3. A combination planter and step-light according to claim 2 wherein, the housing module contains a lamp, a lamp control circuit and a photosensitive device for detecting the ambient light level and which is connected to the lamp control circuit to switch the lamp on and off when the ambient light level falls below and increases above a predetermined threshold, at dusk and dawn, respectively.

4. A combination planter and step-light according to claim 2 wherein the receptacle is molded in one-piece and the compartment is integrally formed by the molding step as an open bottomed cavity opening through the base and sealed from the plant receiving interior of the receptacle by an upstanding, half-height inner wall portion which bridges facing sidewalls and is closed at a top by a horizontal wall portion bridging the facing sidewalls and an adjacent sidewall.

5. A combination planter and step-light according to claim 4 wherein the slot is a vertical slot communicating through the base with the open bottom of the cavity and is no higher than the compartment.

6. A combination planter and step-light comprising a portable, elongate, tapering receptacle for plants and potting and having a base and a plurality of sidewalls upstanding therefrom to form an open plant receiving top, the sidewalls comprising a minor rear end wall and a major outer wall joined at right angles to form a corner for seating adjacent a corner of a step and an outer end of the step, and joined at free ends of said minor and major walls by an inner facing wall which converges toward the major outer wall as it extends outward and forwards toward the free end of the major outer wall, an aperture being formed in a portion of the inner wall, and means for producing light located in the receptacle in alignment with the aperture so that the light is emitted from the wall as an inwardly directed beam the receptacle having a compartment which communicates with the aperture and which receives and isolates the light producing means from any plants and potting contained in the receptacle;

wherein the light producing means comprises a lamp, a lamp control circuit and a photosensitive device for detecting the ambient light level and which is connected to the lamp control circuit to switch the lamp on and off when the ambient light level falls below and increases above a predetermined threshold, at dusk and dawn, respectively, wherein the lamp, photosensitive device and lamp control circuit and a battery power supply are contained in a moisture proof housing module;

wherein the receptacle is molded in one-piece, the compartment is integrally formed by the molding step as an open bottomed cavity adjacent the rear wall, opening through the base and at the aperture through the facing wall and sealed from the plant receiving interior of the receptacle by an upstanding, half-height inner wall portion which bridges the outer and facing walls, spaced apart from the rear wall and is closed at a top by a horizontal wall portion bridging the inner wall portion, rear, face and outer walls;

wherein the aperture is a vertical slot communicating through the base with the open bottom of the cavity and of a less height than the compartment; and wherein the housing module has a rectanguloid, rigid plastic housing body wider than a width of the aperture slot and a lamp receiving portion of less width than the width of the slot extending from a front end face on a free end of which is a mounting flange of greater width than the slot so that the lamp receiving portion defines a neck permitting the module to be inserted upwards through the bottom opening into the cavity with the neck sliding up the slot and edge portions of the mounting flange engaging the facing wall in module mounting engagement mounting with the facing wall adjacent the slot.

* * * * *